(12) United States Patent
Sasame et al.

(10) Patent No.: US 8,741,371 B2
(45) Date of Patent: Jun. 3, 2014

(54) TEA LEAVES FOR EXTRACTION OF GREEN TEA BEVERAGE

(75) Inventors: Masami Sasame, Shizuoka (JP); Hitoshi Kinugasa, Shizuoka (JP); Kazunori Okanoya, Shizuoka (JP); Fumio Ito, Shizuoka (JP); Hitoshi Iryo, Shizuoka (JP)

(73) Assignee: Ito En, Ltd., Tokyo (JP)

( * ) Notice: Subject to any disclaimer, the term of this patent is extended or adjusted under 35 U.S.C. 154(b) by 196 days.

(21) Appl. No.: 13/264,717

(22) PCT Filed: Apr. 14, 2010

(86) PCT No.: PCT/JP2010/056958
§ 371 (c)(1),
(2), (4) Date: Jan. 24, 2012

(87) PCT Pub. No.: WO2010/119978
PCT Pub. Date: Oct. 21, 2010

(65) Prior Publication Data
US 2012/0114801 A1    May 10, 2012

(30) Foreign Application Priority Data
Apr. 17, 2009  (JP) .................................. 2009-100648

(51) Int. Cl.
A23F 3/00   (2006.01)
A23F 3/16   (2006.01)

(52) U.S. Cl.
USPC ............................................ 426/597; 426/77

(58) Field of Classification Search
USPC ........................................ 426/597, 77, 520
IPC ... A23F 3/00,3/16, 3/06, 3/12, 2/38; A23P 1/12
See application file for complete search history.

(56) References Cited

U.S. PATENT DOCUMENTS

2002/0028281 A1* 3/2002 Omura ......................... 426/597

FOREIGN PATENT DOCUMENTS

| | | |
|---|---|---|
| EP | 1 149 535 A2 | 10/2001 |
| JP | 02-128649 | 5/1990 |
| JP | 06-269246 | 9/1994 |
| JP | 08-173038 | 7/1996 |
| JP | 2001-211830 | 8/2001 |
| JP | 2002-010736 | 1/2002 |
| JP | 2002-034457 | 2/2002 |
| JP | 2003-310161 | 11/2003 |
| JP | 2004-208605 | 7/2004 |
| JP | 2004-359249 | 12/2004 |
| JP | 2005-058210 | 3/2005 |
| JP | 2005-130809 | 5/2005 |
| JP | 2007-124921 | 5/2007 |
| JP | 2008-000044 | 1/2008 |
| JP | 2008-220226 | 9/2008 |

OTHER PUBLICATIONS

Yamamoto, Chemistry and Applications of Green Tea, 1997, p. 2.*
Chichester, Advances in Food Research vol. 17, p. 232 Academic Press 1969.*
Anan, T. et al. "Changes in the Free Sugar Contents of Green Tea during Heating or Storage", Chagyo Gijutsu Kenkyu, 1984, No. 66, pp. 47-51.
International Search Report in PCT/JP2010/056958 dated Jun. 8, 2010, pp. 1-2.
Written Reply (with translation) in PCT/JP2010/056958 dated Jun. 8, 2010. pp. 1-21.
"Shinchagyo Zensho", Chamber of Tea Association of Shizuoka Pref., pp. 275-276, 1988, edited by Chamber of Tea Association of Shizuoka Pref.

* cited by examiner

*Primary Examiner* — Kelly Bekker
(74) *Attorney, Agent, or Firm* — Foley & Lardner LLP

(57) ABSTRACT

Provided are tea leaves for green tea beverage extraction. A green tea beverage that can be stored without sediments precipitating and without turning brown, and also tastes good chilled, can be extracted from said leaves. Said leaves are characterized in that the relationship between X and Y fulfills condition (1), where X is the weight fraction of theanine content with respect to the total weight of dried tea leaves, and Y is the weight fraction of monosaccharide content with respect to caffeine content.

$$-0.136X+0.35 \leq Y \leq -0.136X+0.46. \quad (1)$$

7 Claims, 4 Drawing Sheets

TEA LEAVES FOR EXTRACTION OF GREEN TEA BEVERAGE

TECHNICAL FIELD

The present invention relates to tea leaves for extraction of a green tea beverage that can be suitably used as raw tea leaves of a green tea beverage packed in a container that are filled into a container such as a can or a PET bottle, or tea leaves that are filled into a tea bag and the like.

BACKGROUND ART

A tea has been familiar to people in the world through the ages, and the kind thereof is various such as unfermented teas represented by a green tea, semi-fermented teas represented by an oolong tea, and fermented teas represented by a red tea and the like, and a drinking method thereof is also various.

Most of Japanese green teas including those on sale in a form of tea leaves and a beverage are produced through a series of processes of subjecting plucked tea live leaves to steaming with vapor, inactivation (oxidase deactivation) of oxidation enzymes contained in the tea live leaves, and then rolling by rough rolling, rolling, secondary drying and refined rolling and the like, and drying (see Non-Patent Document 1).

By subjecting live tea leaves to oxidase deactivation with a steaming method of steaming the tea leaves with vapor as described above, total tea leaves become soft by steaming heat, and thus it is possible to enhance dissolution of components in the tea leaves, and brew a rich tea.

On the other hand, for Chinese tea or Japanese oven-roasted tea (a bead green tea made by kamairi) and the like, an inactivation (oxidase deactivation) method for oxidation enzymes by roasting tea leaves with a heated oven is adopted instead of steaming heat (see Non-Patent Document 1).

If tea leaves are subjected to oxidase deactivation by direct flame heating, unique flavor of oven roasting can be boosted, and at the same time, refreshing tea taste can be completed, and thus tea beverages using raw tea leaves produced by oven roasting are on sale recently.

On the other hand, a green tea beverage has problems such as weakness to oxidation deterioration, generation of deteriorated odor, and in addition, sediments called primary sediments generated immediately after production (also called cream down). In case of a green tea, the green tea has problems such as generation of precipitate called secondary sediments during storage and the like. Therefore, from the past, various approaches for processed tea leaves used as raw materials of a green tea beverage have been conducted for the purpose of suppressing oxidation deterioration, suppressing generation of unpleasant odor, and furthermore, suppressing generation of primary sediments or secondary sediments.

For example, there has been disclosed a method of producing raw tea by oven roasting treatment with direct flame, whereby to less likely to occur generation of fine powders and suppress generation of deteriorated odor (Patent Document 1). In addition, there has been disclosed a method of controlling and suppressing secondary sediments generation using theogallin or strictinin in tea leaves as a marker (Patent Documents 2 and 3).

In addition, there has been disclosed a method of producing raw tea for a beverage, wherein tea leaves are set in a bath under reduced pressure and heated by microwave or far-infrared ray under reduced pressure, and dried for a short time, whereby to suppress oxidation of the raw tea (Patent Document 4).

Furthermore, it has been disclosed a method of producing a beverage having stable color tone for a long time and having high concentration catechin by adjusting the contents of glucose and fructose in a green tea beverage to a certain amount, suppressing concentration of oxalic acid, and adjusting the ratio of caffeine to non-polymer catechins (Patent Document 5).

PRIOR ART DOCUMENT

Non-Patent Document

Non-Patent Document 1: "Shinchagyo Zensho", Chamber of Tea Association of Shizuoka Pref., pp 275-276, 1988, edited by Chamber of Tea Association of Shizuoka Pref.

Patent Document

Patent Document 1: Japanese Patent Application Laid-Open (JP-A) No. 2004-208605
Patent Document 2: JP-A No. 2008-000044
Patent Document 3: JP-A No. 2003-310161
Patent Document 4: JP-A No. 2002-34457
Patent Document 5: JP-A No. 2005-058210

SUMMARY OF THE INVENTION

Problems to be Solved by the Invention

In Japan, a green tea was usually drunk in a warm state which was made with a teapot and the like from the past. However, with prevalence of a green tea beverage packed in a container such as a green tea beverage packed in a PET bottle and the like, new problems have occurred. In other words, in a case of a green tea beverage packed in a container, the green tea beverage packed in a container is stored for a while after being produced, and thus during this time, no time degradation such as generation of sediments, brownish discoloration and the like is demanded. In addition, a green tea beverage packed in a container is often drunk in a cold state, and thus is demanded to be capable of be drunk deliciously even in a cold state. Furthermore, since a green tea beverage packed in a container is produced industrially, raw tea leaves that allow effective extraction of delicious tea for a short time, are demanded. These points are the same for raw tea leaves for a tea bag.

In order to provide tea leaves for extraction of a green tea beverage that are suitable as a raw tea for a green tea beverage packed in a container that is filled into a container such as a can and a PET bottle, or as a raw tea that is filled into a tea bag or the like, the present invention provides new tea leaves for extraction of a green tea beverage that allow extraction of a green tea beverage that is less likely to occur sediments, brownish discoloration and the like even in storage, and can be drunk deliciously even in a cold state, preferably tea leaves for extraction of a green tea beverage that allow effective extraction of delicious tea for a short time.

Means for Solving the Problems

To solve such problems, the present invention suggests tea leaves for extraction of a green tea beverage, which are characterized in that the relationship of the weight fraction X(%) of the theanine content relative to the total weight of dry tea leaves, with the weight fraction Y of the monosaccharide content relative to the caffeine content, fulfills the following condition (1):

$$-0.136X+0.35 \leq Y \leq -0.136X+0.46 \qquad (1)$$

Such tea leaves for extraction of a green tea beverage allow extraction of a green tea beverage that is less likely to occur sediments, brownish discoloration and the like even in storage, and can be drunk deliciously even in a cold state.

Furthermore, since the tea leaves for extraction of a green tea beverage allow effective extraction of delicious tea for a short time by means of adjustment of the consolidation ratio to 0.85 to 0.95, and thus the tea leaves for extraction of a green tea beverage are suitable for industrial production of a green tea beverage packed in a container. In addition, since the tea leaves for extraction of a green tea beverage can be extracted for a short time, the tea leaves for extraction of a green tea beverage are also suitably used as a green tea contained in a tea bag.

Consequently, the tea leaves for extraction of a green tea beverage of the present invention can be suitably used as raw tea leaves for extraction of a green tea beverage that are filled into a container such as a can and a PET bottle, or as tea leaves that are filled into a tea bag and the like.

MODE FOR CARRYING OUT THE INVENTION

Hereinafter, one embodiment of the present invention will be explained. However, the scope of the present invention is not limited to this embodiment.

<Tea Leaves for Extraction of Green Tea Beverage>

The tea leaves for extraction of a green tea beverage in the present embodiment (hereinafter, referred to as the "present tea leaves for extraction") are tea leaves that are characterized by a certain relation of the fraction of theanine content contained in tea leaves, with the weight fraction of the monosaccharide content relative to the caffeine content.

(Kind of Tea)

The present tea leaves for extraction are leaves or stems of a tea plant, *Camellia sinensis*, or processed tea leaves produced from them as raw materials, and may be a green tea as a unfermented tea such as a decocted tea, a refined green tea, a stem tea, a Kabusecha tea, a Tencha tea, a powdered green tea, a Bancha tea, a roasted green tea, an oven-roasted tea and the like, or may be a flower tea in which these green teas are flavored with aroma such as jasmine, lotus, Sweet Olive, citron, chrysanthemum and the like.

(Composition of Tea Leaves)

The critical point of the present tea leaves for extraction is that the relation of the weight fraction X(%) of the theanine content relative to the total weight of dry tea leaves, with the weight fraction Y of the monosaccharide content relative to the caffeine content fulfills the following condition (1):

$$-0.136X+0.35 \leq Y \leq -0.136X+0.46 \quad (1)$$

Figure 1:
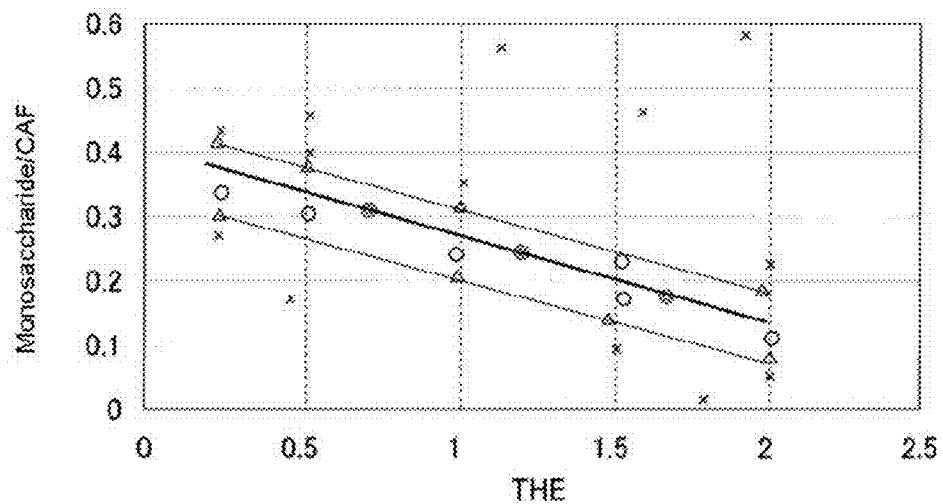
FIG. 1 is a graph in which the measurement values for sample Nos. 1 to 30 obtained in Test 1 are plotted in a coordinate where the X axis is the weight fraction (%) of the theanine content, and the Y axis is the weight fraction of the monosaccharide content relative to the caffeine content.

As shown in FIG. 1 of Examples described below, the relation of the weight fraction X(%) of the theanine content with the weight fraction Y of the monosaccharide content relative to the caffeine content were studied. As a result, it was found out that tea leaves of which the Y is present between Y=−0.136X+0.35 and Y=−0.136X+0.46 allowed extraction of a green tea beverage that can be drunk deliciously even in a cold state and is less likely to occur sediments, brownish discoloration and the like even in storage.

Particularly, it was found out that further preferable are tea leaves that fulfill the condition of −0.136X+0.37≤Y≤−0.136X+0.44, and further more preferable are tea leaves that fulfill the condition of −0.136X+0.39≤Y≤−0.136X+0.41.

In preparation of the tea leaves that fulfill such condition (1), it is preferable to produce tea leaves with attention to the following viewpoints.

In a drying method in the related art, tea leaves are dried with hot wind for a long time. However, tea leaves and the like are dried instantly with heating by direct flame heat for a short time, and the temperature and the heating time of the direct flame heat are regulated at this time, whereby to adjust the weight fraction of monosaccharides, and produce tea leaves that fulfill the condition (1). If the heating temperature is high, monosaccharides tend to decrease.

In other words, instead of limping and rough rolling for tea leaves in the related art, tea leaves are preferably brought into contact with a hot body heated to 100 to 160° C., particularly 110 to 150° C., preferably 120 to 140° C. for 5 seconds to 30 seconds, preferably 10 seconds to 20 seconds as primary drying.

At this time, if the fraction Y of monosaccharides is higher than a desired value, the heating temperature may be elevated at the time of the primary drying.

The "monosaccharides" in the present invention refers to glucose and fructose.

The present tea leaves for extraction preferably further fulfill following condition (2):

$$X=0.2 \text{ to } 2.0(\%) \quad (2)$$

If the weight fraction (%) of the theanine content relative to the total weight of dry tea leaves is 0.2% or more, the tea leaves are excellent in flavor stability, and have good extraction stability. If the weight fraction (%) of the theanine content relative to the total weight of dry tea leaves is 2.0% or less, the tea leaves are excellent in extraction stability and also have good flavor stability.

From such viewpoints, the weight fraction (%) of the theanine content relative to the total weight of dry tea leaves is preferably 0.5 to 1.8%, and particularly further preferably 0.7 to 1.7%.

The content of theanine tends to be high when the tea season is early and the fiber amount is small, and to decrease when the tea season is late and the fiber amount is high. Consequently, selection of the tea season may be a suitable method of adjusting the theanine content. Furthermore, the theanine content may be also adjusted by growth of sprout or coating treatment.

(Form of Tea Leaves)

Figure 5:
FIG. 5 is an enlarged photograph of the inside of the tea leaves of FIG. 4.
Figure 6:
FIG. 6 is a photograph of the appearance of sample No. 30 obtained in Test 1.
Figure 7:
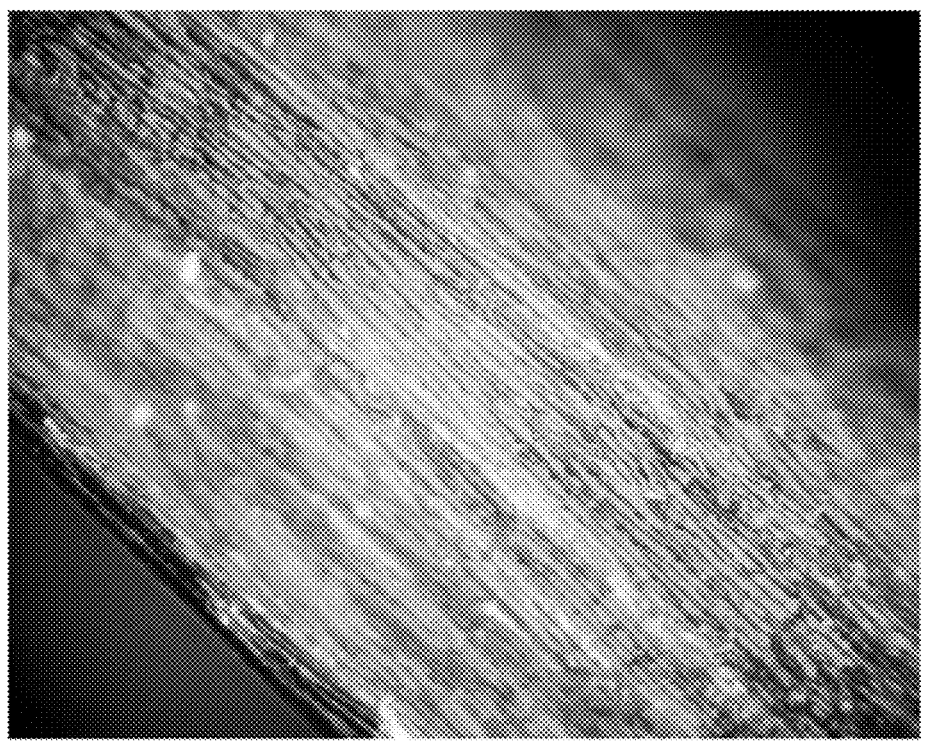
FIG. 7 is an enlarged photograph of the inside of the tea leaves of FIG. 6.

Conventional tea leaves are shaped to a rod-like form such as a needle by twisting one piece of tea leaf (see FIGS. 6 and 7). However, tea leaves in a massive form in which plural tea leaves gather, and which has a space in the inside, are preferable for extraction of a green tea beverage (see FIGS. 4 and 5).

In a case of a green tea beverage packed in a container or green tea in a tea bag, it is demanded to extract a green tea effectively for a short time. It was revealed that tea leaves in a massive form in which plural tea leaves gather, and which has a space in the inside, allow effective extraction of a green tea for a short time, when compared to the conventional tea leaves that are formed to a rod-like form such as a needle by twisting one piece of tea leaf.

However, the massive form is not particularly limited in its shape, but means any shape, for example, of spherical body, ellipsoidal spherical body, cylindrical body, rectangular body and the like.

(Consolidation Ratio)

The ratio when the tea leaves are consolidated (called "consolidation ratio") is one marker that represents the form of the tea leaves as described above, and the consolidation ratio in the present tea leaves for extraction is preferably in a range of 0.85 to 0.95.

If the consolidation ratio of the present tea leaves for extraction is in a range of 0.85 to 0.95, the present tea leaves are excellent in effective extraction, and allow effective extraction of delicious green tea for a short time. From such viewpoints, the consolidation ratio is preferably 0.88 to 0.93, and particularly more preferably 0.89 to 0.91.

If the extraction rate of tea leaves, etc. is too slow, the extraction should be done for a long time, and thus is not effective, and unwanted coarse taste in a tea extraction liquid is likely to be extracted together, and thus it is not desirable. If the extraction rate of tea leaves, etc. is too fast, the extraction is effective, but adjustment of extraction to adjust the flavor becomes difficult and burden of filtration increases.

The "consolidation ratio" of the tea leaves prescribed in the present invention is a ratio of the "consolidated bulk density" measured when tea leaves are filled into a container under vibration, relative to the "loose bulk density" measured when tea leaves are naturally dropped and filled into a container.

Consolidation ratio="consolidated bulk density"/
"loose bulk density"

<Production Method>

Hereinafter, a preferable production method for the present tea leaves for extraction will be explained, but the production method for the present tea leaves for extraction is not limited thereto.

Figure 2:
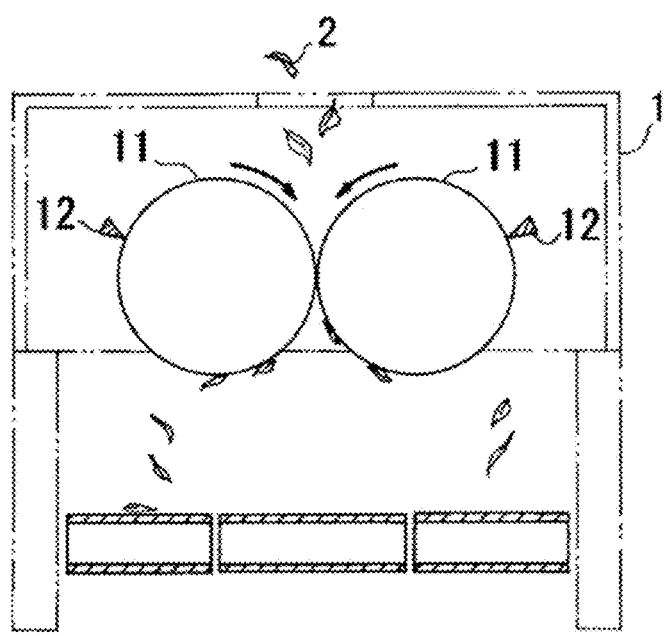
FIG. 2 is a drawing that shows one example of a primary drying device that is used in production of the present tea leaves for extraction.
Figure 3:
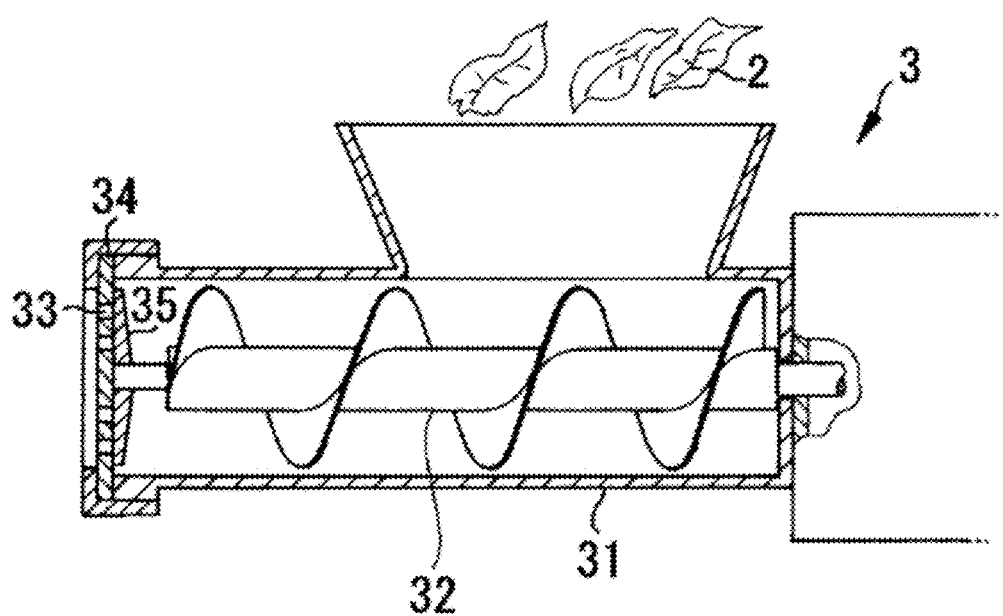
FIG. 3 is a drawing that shows one example of a rolling/shaping device that is used in production of the present tea leaves for extraction.

The present tea leaves for extraction can be suitably produced, for example, by conducting primary drying for steamed tea leaves with a device shown in FIG. 2 to adjust the moisture amount of the tea leaves, and then conducting rolling and shaping by rolling tea leaves and extruding them from pores under pressure with a device shown in FIG. 3, and then performing secondary drying with blowing hot wind of 80° C. in a drying device.

However, the production method is not limited to such production method.

In the primary drying described above, as shown in FIG. 2, tea leaves are put in between two rotation rollers (hot body) 11 and 11, that are heated to 100 to 160° C., whereby to bring the tea leaves into contact with the heated rollers 11 and pressurize the tea leaves between the rollers 11 and 11 whereby to push and crush hardly-dried region of tea leaves (a portion of the stem or core), and attach the tea leaves to the surface of the rollers 11 as they are for 5 seconds to 30 seconds to perform heat drying, and scratch off and separate the tea leaves from the roller surface with an object 12 such as a spatula.

In this case, the time when the tea leaves are attached to the roller surface becomes the drying time.

In addition, in the primary drying, the tea leaves (including stem) are pressurized preferably such that the thickness of the tea leaves is equal to or less than 0.4 mm, preferably in a range of 0.1 mm to 0.4 mm, and further preferably in a range of 0.2 mm to 0.3 mm. In addition, the primary drying is preferably conducted such that the moisture amount of the tea leaves is 30 to 70% by mass, and particularly about 40 to 60% by mass.

The rolling and shaping described above can be carried out with a device shown in FIG. 3, specifically, a device 3 having a conveying screw 32 that rotates in a cylinder 31; a plate 34 that has multiple pores 33 incarcerated on the exit of the cylinder 31; and a knife 35 that rotates in the vicinity of the plate 34. By using this device, it is possible to pressure-feed the tea leaves under rolling with the conveying screw 32 toward the exit direction, extrude the tea leaves 2 from the pores 33 of the plate 34, and cut the extrude with the knife 35 that rotates while being in sliding contact with the inner surface of the plate 34 to shape a massive form of the tea leaves.

If the tea leaves are subjected to rolling and shaping as described above, the tea leaves are different from conventional ones formed as a hard rod-like form such as a needle by twisting one piece of tea leaf, and can be shaped to a massive form in which plural tea leaves gather, and which has a space in the inside.

The degree of rolling, the shape of tea leaves after the treatment and the like may be adjusted by the rotation rate of the conveying screw, the pore size of the plate and the like.

The rotation rate of the conveying screw is preferably 40 rpm to 400 rpm, particularly 60 rpm to 300 rpm.

In addition, the pore diameter of the plate, in other words, the diameter of the pore into which the tea leaves are extruded is preferably formed to be 3.2 mm to 19.0 mm, particularly 6.4 mm to 12.8 mm. This pore is preferably formed in a ratio of 0.20 $m^2$ to 0.50 $m^2$, particularly preferably 0.25 $m^2$ to 0.45 $m^2$, and further preferably 0.30 $m^2$ to 0.40 $m^2$ per 1 $m^2$. The time taken from the input to the extrusion of the tea leaves is preferably 5 seconds to 30 seconds, particularly preferably 5 seconds to 20 seconds.

In addition, the rolling and shaping process is preferably performed with cooling the product temperature to 40° C. or more, preferably 30° C. or more in order to prevent deterioration of the quality.

At this time, the cooling means may be any means, such as cooling the device with cooling water and the like, or cooling the device with input of ice or dry ice along with the tea leaves.

Specific means of the secondary drying is not particularly limited, and a drying method performed from the past may be adopted, and the drying is preferably performed to 5 to 10% by mass of the moisture amount of the leaves.

The tea leaves obtained from the secondary drying may be used as raw tea leaves for extraction for production of a green tea beverage packed in a container as they are, but may be further subjected to, for example, homogenization treatment of the particle size or the shape of Aracha tea in order to achieve the extraction efficiency and homogenization of extraction components, or may be subjected to firing treatment in order to modify the flavor. In addition, the tea leaves may be subjected to a treatment of pulverization to give fine particle size in order to be filled into a tea bag.

<Use>

Hereinafter, preferable use of the present tea leaves for extraction will be explained. However, the use of the present tea leaves for extraction is not intended to be limited to the uses explained below.

(Tea Leaves Packed in Container)

The present tea leaves for extraction may be sold as enclosed in various package containers.

At this time, the package container may be any container made of a paper, vinyl, a metal, a plastic or a complex thereof, and the tea leaves once packaged may be also further enclosed in the same or another kind of a package container.

Herein, the package container may be any container such as a box, a bag, or a container similar to them, and the shape or color of the package container is not particularly limited. However, the package container is particularly preferably those excellent in light blocking effect or oxygen barrier properties in consideration of weakness of the tea leaves to deterioration by light, oxygen or moisture.

(Tea Bag)

The present tea leaves for extraction may be enclosed in a tea bag in consideration of simplicity. At this time, a known method may be suitably used with regard to a size, a material or a shape of a tea bag, or presence or absence of a tag, and the like.

The amount of the present tea leaves for extraction to be enclosed in a tea bag may be selected in consideration of deliciousness or flavoring property of the extraction liquid and effectiveness of extraction.

(Raw Material for Instant Tea)

The present tea leaves for extraction may be also used as a raw material for an instant tea.

In order to process the present tea leaves for extraction as an instant tea, for example, the present tea leaves for extraction are subjected to pulverization and granulation process, to give granular tea powders, or an extraction liquid obtained by extraction of the present tea leaves for extraction may be dried. At this time, the stem portion contained in tea leaves and the like may be instantly pulverized before or at the same time as the drying process by being compacted to equal to or less than 0.1 mm, whereby to produce an instant tea excellent in tea water color and freshness.

(Raw Material for Powder Tea)

The present tea leaves for extraction may be also used as a raw material for a powder tea.

In order to process the present tea leaves for extraction as a powder tea, for example, the present tea leaves for extraction may be pulverized with use of a pulverization machine such as a stone mill, a ball mill, a power mill, a pin mill, a jet mill and the like, whereby to give fine powders. Specific examples of the powder tea include a powdered tea and the like.

(Raw Tea for Beverage Packed in Container)

The present tea leaves for extraction may be suitably used as a raw tea for extraction of a green tea beverage packed in a container.

The green tea beverage packed in a container refers to those commercialized by filling a green tea beverage into a tight-seal container such as a metal can, a plastic container, a PET bottle, a glass bottle and a paper container. Particularly, a technique of suppressing flock is strongly demanded particularly for a transparent container such as a PET bottle, a transparent plastic container and a glass bottle, of which the appearance has a great influence on the value of a commercial product.

Herein, one example of a production method for a green tea beverage packed in a container will be explained.

First, the present tea leaves for extraction, which are a raw material, are extracted with 20 to 50 weight folds of water. The extraction time and temperature are suitably adjusted depending on the kind of tea leaves used, demanded quality or deliciousness of a tea beverage (for example, extraction at low temperature gives stronger delicious taste and extraction at high temperature gives stronger astringent taste) and the like, but the extraction is conducted usually at 45 to 95° C. for 3 to 30 minutes, along with stirring during the extraction procedure if necessary.

Then, insoluble objects such as tea dregs are removed by filtration, centrifugation and the like to obtain a tea extraction liquid. To this tea extraction liquid, water is added for dilution to a suitable concentration for drinking, and 100 to 2000 ppm of ascorbic acid or a salt thereof or the like is add to prevent oxidation, or 100 to 2000 ppm of sodium hydrogen carbonate or the like is added to adjust pH to 5.0 to 7.0, and other additives are added if necessary to obtain a blend liquid of a tea beverage.

Then, the blend liquid of the tea beverage obtained as described above is filled into a tight-seal container such as a metal can, a plastic container, a PET bottle, a glass bottle and a paper container, and sterilized to produce a green tea beverage packed in a container.

As the green tea beverage packed in a container, brown rice, leaves, stems, roots of various vegetables or the like may be blended and extracted with the present tea leaves for extraction.

In addition, to the green tea extraction liquid, an extraction liquid or extract obtained by extraction of brown rice, leaves, stems or roots of various vegetables, or the like, may be added, or a catechin composition obtained by purification of the green tea extraction liquid (for example, THEAFLAN 30 or 90, or the like manufactured by ITO EN, LTD.) may be added, and in addition, an antioxidant, a preservative, a cyclic oligomer, a dietary fiber, an emulsifier, a colorant, a perfume, a stabilizer, a pH adjusting agent, an acidulant, a sweetener, a fruit juice, a nutrient reinforcement agent or the like may be added alone or in combination.

In addition, in order to supplement or augment the effects of flock suppression or prevention in a green tea beverage packed in a container, if necessary, a known method of suppressing or preventing flock generation, for example, a method of decomposing aqueous polymeric polysaccharide components by enzyme treatment, a method of physically removing a causative substance or a precipitate (flock) by ultrafiltration or diatomaceous earth filtration, or a method of adding a flock-suppression substance, or the like may be incorporated into the production process of the green tea beverage packed in a container.

(Explanation for Terms)

When the "major component" is expressed in the detailed description of the present invention, it comprises a meaning that other components may be included unless it impedes a function of the major component. At this time, the content ratio of the major component is not specified, and an extraction liquid or extract obtained by extraction of a green tea, preferably takes up 50% or less by mass, particularly 70% or less by mass, and particularly 80% or less (including 100%) by mass in the beverage except the moisture.

In addition, the "green tea beverage packed in a container" means a green tea beverage which is filled into a container, and also means a green tea beverage that can be drunk without dilution.

When "X to Y" (X and Y are any number) is expressed in the present specification, it encompasses the meaning of "X or more and Y or less", "preferably greater than X" and "preferably less than Y". In addition, when "X or more" (X is any number) or "Y or less" (Y is any number) is expressed in the present specification, it encompasses the meaning of "greater than X is preferable" and "less than Y is preferable" unless otherwise stated.

EXAMPLES

Hereinafter, Examples of the present invention will be explained in more detail. However, the present invention is not limited to the Examples.

[Test 1]

For tea leaves prepared by a different production method from a conventional one, analysis and evaluation were conducted, and characteristics of the components and evaluation results were studied.

<Sample Nos. 1 to 24>

Among live tea leaves (produced in Shizuoka Prefecture, Yabukita species) plucked in a tea season of early in May to early in October, live tea leaves having 0.2 to 2.0% of the theanine amount were selected, and the selected live tea leaves were treated with steaming for 30 seconds with zero pressure vapor using a continuous conveying belt-type steamer (70 to 80% moisture rate). Then, the tea leaves were pressurized, pushed and crushed using a primary drying device shown in FIG. 2 (0.3 mm gap between rollers), and brought into contact with heating rollers heated to 95 to 165° C. for 3 seconds to 60 seconds, to obtain 0.3 mm thickness and 30 to 70% moisture rate of the tea leaves (including the stem). Then, rolling and shaping were conducted (30 to 70% moisture rate) using a device shown in FIG. 3 (for the pores of the plate, pores having 9.5 mm diameter were drilled in a ratio of 0.3 m$^2$ per 1 m$^2$, and the diameter of the conveying screw was 55 mm, and the length of the conveying screw was 250 mm) at 230 rpm of the conveying screw rotation rate, 20 seconds of the rolling and shaping time, and 30 to 40° C. of the product temperature in the pressure feed, and then secondary drying was conducted at the condition of 80° C. to obtain raw tea leaves for a beverage (sample) (5 to 10% moisture rate).

The thickness of the tea leaves (including the stem) was adjusted to 0.3 mm by regulating the gap between the two parallel heating rollers to 0.3 mm.

<Sample Nos. 25 to 30>

Among live tea leaves (produced in Shizuoka Prefecture, Yabukita species) plucked in a tea season of early in May to early in October, live tea leaves having 0.2 to 2.0% of the theanine amount were selected, and the selected live tea leaves were treated with steaming for 30 seconds with zero pressure vapor using a continuous conveying belt-type steamer (70 to 80% moisture rate). Then, the tea leaves were subjected to cooling, rough rolling, rolling, secondary drying, refined rolling and drying in a similar manner to conventional one, to obtain raw tea leaves for a beverage (sample).

The temperature and the time in each process of rough rolling, rolling, secondary drying, refined rolling and drying according to a standard process were set as follows:

Rough rolling: 110° C. and 5 minutes in initial stage, and 80° C. and 30 to 40 minutes in intermediate and last stages Rolling: room temperature, 20 to 30 minutes Secondary drying: 60° C., 20 minutes Refined rolling: 90° C., 30 to 40 minutes Drying: 80° C., 30 to 40 minutes <Analysis of Sample>

The components of each of the samples No. 1 to 30 obtained were analyzed in a method described below.

(Analysis Method of Theanine)

Each sample (raw tea leaves for a beverage) was pulverized with a cyclone mill, and filled into an exclusive cell, and then the theanine content was determined with INSTALAB 600 near-infrared analyzer manufactured by Shizuoka-Seiki Corporation, and the weight fraction (%) of the theanine content relative to the total weight of dry tea leaves was calculated, and this value was shown in Table 2 as the "theanine (%)".

(Analysis Method for Saccharide)

According to the following analysis method, the weight fraction (%) of the theanine content of monosaccharides relative to the total weight of dry tea leaves was measured.

At this time, quantity-determined monosaccharides are glucose and fructose.

(1) Preparation Method for Sample 50 mg of the pulverized tea leaves were taken, and extracted with ultrasonic wave using 50 mL ultrapure water for 15 minutes. 500 μL of the extracted sample was taken, and added with 100 μL of 100 mM NaOH, 100 μL of 50 ppm Lactose and 400 μL of ultrapure water and well stirred, to prepare a sample.

(2) Analysis Condition

Analysis device: HPLC saccharide analysis device manufactured by Dionex Corporation Column: Carbopack PA1 (4.6 mm×250 mm) (P/N35391 manufactured by Dionex Corporation)

Column temperature: 30° C.

Flow Rate: 1.0 mL/min

Mobile Phase: Phase A 200 mM NaOH, Phase B 1000 mM Sodium Acetate, Phase C ultrapure water Injection amount: 25 μL Detector: "ED50 gold electrode" manufactured by Dionex Corporation Gradient condition: See Table 1 below

TABLE 1

| TIME (min) | Phase A (%) | Phase B (%) | Phase C (%) | Flow (ml) |
| --- | --- | --- | --- | --- |
| INITIAL | 15 | 0 | 85 | 1 |
| 14 | 15 | 0 | 85 | 1 |
| 30 | 100 | 0 | 0 | 1 |
| 31 | 0 | 100 | 0 | 1 |
| 40 | 0 | 100 | 0 | 1 |
| 41 | 15 | 0 | 85 | 1 |
| 55 | 15 | 0 | 85 | 1 |

(Analysis Method for Caffeine)

(1) Preparation Method for Sample 200 mg of the pulverized tea leaves were taken, and extracted with ultrasonic wave using 100 mL 20% acetonitrile for 60 minutes. The extraction liquid was filtered with a membrane filter (0.45 μm) to prepare a sample.

(2) Analysis Condition

Analysis device: Xbridge shield RP18 3.5 mm×150 mm manufactured by Waters Corporation Column temperature: 40° C.

Flow Rate: 0.5 mL/min

Mobile Phase: Phase A water, Phase B acetonitrile, Phase C 1% phosphoric acid

Injection amount: 5 μL
Detector: UV Detector UV 230 nm manufactured by Waters Corporation
Gradient condition: See Table 2 below

TABLE 2

| TIME (min) | Flow (ml) | Phase A (%) | Phase B (%) | Phase C (%) |
|---|---|---|---|---|
| INITIAL | 0.5 | 83 | 7 | 10 |
| 5 | 0.5 | 83 | 7 | 10 |
| 7 | 0.5 | 80 | 10 | 10 |
| 12 | 0.5 | 72 | 18 | 10 |
| 23 | 0.5 | 65 | 25 | 10 |
| 30 | 0.5 | 30 | 60 | 10 |
| 40 | 0.5 | 83 | 7 | 10 |

<Evaluation of Beverage Obtained from Sample>

A green tea beverage packed in a container was prepared from each sample Nos. 1 to 30 obtained, and flavor, stability, water color and the like were evaluated as described below immediately after production of the beverage, and after storage.

(Preparation of Green Tea Beverage Packed in Container)

10 g of each sample (raw tea leaves) was extracted with 1000 ml of 70° C. distilled water for 3.5 minutes, and the residue was removed with a mesh (150 mesh). The obtained extraction liquid was rapidly cooled to room temperature, and further subjected to centrifugation (7000 rpm, 10 minutes) to remove insoluble fractions, and then L-ascorbic acid was added in 300 ppm relative to the blend mass-up amount, and the mixture was adjusted to pH 6.0 with sodium bicarbonate, and the obtained blend liquid was subjected to UHT sterilization at 133 to 135° C. for 30 seconds, and then filled into a PET bottle and rapidly cooled to obtain a green tea beverage packed in a container.

(Storage of Green Tea Beverage Packed in Container)

The green tea beverage packed in a container prepared as described above was stored at room temperature for 7 days.

(Evaluation for Flavor of Beverage)

The beverage immediately after the production and the beverage after storage were cooled to 5° C., and then drunk by 5 panelists respectively, and evaluations for aroma and taste were conducted by the standards as described below.

=Evaluation Standard for Flavor=
1: Very good
2: Good
3: Somewhat poor
4: Poor (Evaluation for Stability of Beverage)

The situation for sediments generation of the beverage after storage was visually observed, and evaluations were conducted by the standards as described below.

=Evaluation Standards for Stability=
+++: Large precipitate
++: Some precipitate
+: Slight precipitate
−: No precipitate (Evaluation for Water Color of Beverage)

The beverage immediately after the production and the beverage after storage were visually observed, and the change of the water color was evaluated by the standards as described below.

=Evaluation Standard for Water Color=
1: very excellent
2: Excellent
3: Slightly reddish
4: Brownish discoloration (Total Evaluation)

The evaluations for the flavor in a cold state, the stability of the beverage and the water color of the beverage were generalized and the samples were collectively evaluated by the standards as described below.

=Total Evaluation Standards=
⊚: Very excellent
○: Excellent
Δ: Somewhat Inferior
x: Inferior

TABLE 3

| | | Present Invention | | | | | | | | |
|---|---|---|---|---|---|---|---|---|---|---|
| Sample No. | | 1 | 2 | 3 | 4 | 5 | 6 | 7 | 8 | 9 |
| Theanine (%) | | 2.0 | 2.0 | 2.0 | 1.7 | 1.6 | 1.6 | 1.5 | 1.3 | 1.0 |
| Monosaccharide/CAF | | 0.12 | 0.19 | 0.09 | 0.19 | 0.24 | 0.18 | 0.17 | 0.23 | 0.25 |
| Primary dry temperature (° C.) | | 145 | 150 | 160 | 135 | 118 | 142 | 148 | 125 | 119 |
| Evaluation for flavor | Immediately after production | 1 | 1 | 2 | 1 | 1 | 1 | 2 | 1 | 2 |
| | After storage | 1 | 2 | 2 | 1 | 2 | 2 | 2 | 1 | 2 |
| Evaluation for stability of beverage | Immediately after production | − | − | − | − | − | − | − | − | − |
| | After storage | + | + | + | − | − | − | − | − | − |
| Evaluation for water color of beverage | Immediately after production | 1 | 1 | 1 | 1 | 1 | 1 | 2 | 1 | 2 |
| | After storage | 2 | 2 | 2 | 2 | 2 | 2 | 3 | 2 | 3 |
| Total Evaluation | | ○ | Δ | Δ | ⊚ | ○ | ○ | Δ | ⊚ | ○ |

| | | Present Invention | | | | | | | |
|---|---|---|---|---|---|---|---|---|---|
| Sample No. | | 10 | 11 | 12 | 13 | 14 | 15 | 16 | 17 |
| Theanine (%) | | 1.0 | 1.0 | 0.7 | 0.5 | 0.5 | 0.2 | 0.2 | 0.2 |
| Monosaccharide/CAF | | 0.33 | 0.23 | 0.32 | 0.31 | 0.39 | 0.33 | 0.41 | 0.31 |
| Primary dry temperature (° C.) | | 108 | 152 | 120 | 114 | 105 | 110 | 100 | 109 |
| Evaluation for flavor | Immediately after production | 2 | 2 | 1 | 1 | 1 | 1 | 2 | 2 |
| | After storage | 3 | 2 | 1 | 2 | 3 | 2 | 2 | 3 |
| Evaluation for stability | Immediately after production | − | − | − | − | − | − | − | − |

TABLE 3-continued

|  |  |  |  |  |  |  |  |  |  |
|---|---|---|---|---|---|---|---|---|---|
| of beverage | | – | – | – | – | – | – | – | – |
| Evaluation for water color of beverage | Immediately after production | 2 | 1 | 1 | 1 | 1 | 2 | 2 | 2 |
| | After storage | 3 | 2 | 2 | 2 | 2 | 3 | 3 | 3 |
| Total Evaluation | | Δ | Δ | ⊚ | ◯ | Δ | ◯ | Δ | Δ |

TABLE 4

| | | Comparative product | | | | | | | | | | | |
|---|---|---|---|---|---|---|---|---|---|---|---|---|---|
| Sample No. | | 18 | 19 | 20 | 21 | 22 | 23 | 24 | 25 | 26 | 27 | 28 | 29 | 30 |
| Theanine (%) | | 2.0 | 2.0 | 1.5 | 1.0 | 0.5 | 0.2 | 0.2 | 0.5 | 0.4 | 1.2 | 1.7 | 1.6 | 1.9 |
| Monosaccharide/CAF | | 0.08 | 0.22 | 0.1 | 0.36 | 0.40 | 0.43 | 0.28 | 0.46 | 0.19 | 0.57 | 0.02 | 0.46 | 0.59 |
| Primary dry temperature (° C.) | | 165 | 120 | 160 | 105 | 110 | 95 | 115 | – | – | – | – | – | – |
| Evaluation for flavor | Immediately after production | 1 | 1 | 2 | 2 | 2 | 2 | 2 | 2 | 1 | 1 | 1 | 1 | 1 |
| | After storage | 4 | 4 | 4 | 4 | 3 | 4 | 4 | 4 | 4 | 3 | 3 | 3 | 3 |
| Evaluation for stability | Immediately after production | – | – | – | – | – | – | – | – | – | – | – | – | – |
| | After storage | ++ | ++ | +++ | ++ | +++ | ++ | ++ | ++ | +++ | +++ | +++ | +++ | +++ |
| Evaluation for water color of beverage | Immediately after production | 2 | 1 | 1 | 2 | 2 | 2 | 3 | 3 | 2 | 1 | 1 | 2 | 1 |
| | After storage | 4 | 3 | 4 | 3 | 4 | 3 | 4 | 4 | 4 | 3 | 3 | 4 | 3 |
| Total Evaluation | | X | X | X | X | X | X | X | X | X | X | X | X | X |

(Results/Discussion)

FIG. 1 is a graph in which the measurement values for sample Nos. 1 to 30 are plotted in a coordinate where the X axis is the ratio (%) of the theanine content weight, and the Y axis is the weight fraction of the monosaccharide content relative to the caffeine content.

As a result, it was found out that for any of samples of which Y is present between Y=−0.136X+0.35 and Y=−0.136X+0.46, evaluations for the flavor, the stability and the water color immediately after production of the beverage and after storage were preferable.

In addition, it was recognized that there is a tendency that the evaluations described above were preferable for samples of which Y is present between Y=−0.136X+0.37≤Y≤−0.136X+0.44, and the evaluations described above were further preferable for samples of which Y is present between Y=−0.136X+0.39≤Y≤−0.136X+0.41.

[Test 2]

Along with the observation for the shape of the samples (tea leaves) obtained in Test 1, the consolidation ratio thereof was measured, and the relation of the consolidation ratio with the filtration rate, the extraction rate, the nutritious taste and the like were studied.

<Measurement of Consolidation Ratio>

The consolidation ratio of the sample (tea leaves) was measured as described below.

100 g of each sample was exactly taken, and naturally dropped to a 1000 mL mass cylinder, and the volume was measured, which was assumed as the "loose bulk density". Then 100 g of each sample was exactly taken, and put into a 1000 mL mass cylinder, and the mass cylinder was vibrated with forcible hitting on the bottom to eliminate gaps, and then the volume was measured, which was assumed as the "consolidated bulk density", and the "consolidation ratio" was calculated by the following equation.

Consolidation ratio="Consolidated bulk density"/"loose bulk density"

<Measurement for Filtration Rate>

10 g of each sample (raw tea leaves) was extracted with 1000 ml of 70° C. distilled water for 3.5 minutes, and the tea leaves were removed, and then the extraction liquid was filtered with a stainless mesh (150 mesh, JAS standard). At this time, the filtration time was measured from the start of filtration (measurement initiation), i.e. the time point of the beginning of the flow of the extraction liquid, to the stop, the time point when the extraction liquid disappears on the mesh (measurement completion), and evaluations were conducted with 4 steps (1 to 4) by the standards as described below.

1: Fast (10 seconds to 20 seconds)
2: Somewhat fast (21 seconds to 30 seconds)
3: Somewhat slow (31 seconds to 40 seconds)
4: Slow (41 seconds or more)

<Measurement of Extraction Rate>

10 g of each sample (raw tea leaves) was extracted with 1000 ml of 70° C. distilled water, and time to 0.3 Brix was measured. At this time, Brix was measured with DD7 differential refractometer manufactured by ATAGO CO., LTD. Then, evaluations were conducted with 4 steps (1 to 4) by the standards as described below.

1: Very fast (90 seconds or less of the extraction rate)
2: Fast (91 to 120 seconds of the extraction rate)
3: Somewhat slow (121 to 150 seconds of the extraction rate)
4: Slow (151 seconds or more of the extraction rate)

<Evaluation of Beverage Obtained from Sample>

A green tea beverage packed in a container was prepared from each sample (raw tea leaves), and the nutritious taste of the beverage immediately after production of the beverage was evaluated as described below.

(Preparation of Green Tea Beverage Packed in Container)

10 g of each sample (raw tea leaves) was extracted with 1000 ml of 70° C. distilled water for 3.5 minutes, and the residue was removed with a mesh (150 mesh). The obtained extraction liquid was rapidly cooled to room temperature, and further subjected to centrifugation (7000 rpm, 10 minutes) to remove insoluble fractions, and then L-ascorbic acid was added in 300 ppm relative to the blend mass-up amount, and the mixture was adjusted to pH 6.0 with sodium bicarbonate, and the obtained blend liquid was subjected to UHT sterilization at 133 to 135° C. for 30 seconds, and then filled into a PET bottle and rapidly cooled to obtain a green tea beverage packed in a container.

(Evaluation for Nutritious Taste of Beverage)

The beverage immediately after being produced (5° C.) was drunk by 5 panelists, and evaluations for nutritious taste were conducted.

(Total Evaluation)

The evaluations for the flavor in a cold state, the stability of beverage and the water color of beverage were generalized and the samples were collectively evaluated by the standards as described below.

=Total Evaluation Standards=
⊚: Very excellent
○: Excellent
Δ: Somewhat Inferior
×: Inferior From such viewpoints, the consolidation ratio of the present tea leaves for extraction is further preferably in a range of 0.88 to 0.93, and particularly preferably in a range of 0.89 to 0.91.

The invention claimed is:

1. A composition comprising:
    a plurality of dry tea leaves for extraction of a green tea beverage, the plurality of dry tea leaves being compressed in a massive form with a space between the dry tea leaves,
    wherein the tea leaves are processed such that a relationship between a weight fraction X of a total content of theanine relative to a total mass of the dry tea leaves, and a weight fraction Y of a total content of monosaccharides relative to a total content of caffeine in the dry tea leaves, satisfies the following condition:

$$-0.136X+0.35 \leq Y \leq -0.136X+0.46.$$

2. The composition according to claim 1, wherein, a consolidation ratio of the tea leaves is 0.85 to 0.95.

TABLE 5

| | | | | | Present Invention | | | | | |
|---|---|---|---|---|---|---|---|---|---|---|
| Sample No. | 1 | 2 | 4 | 5 | 7 | 8 | 12 | 13 | 14 | 15 |
| Consolidation ratio | 0.92 | 0.95 | 0.90 | 0.88 | 0.85 | 0.89 | 0.91 | 0.92 | 0.94 | 0.93 |
| Theanine (%) | 2.0 | 2.0 | 1.7 | 1.6 | 1.5 | 1.3 | 0.7 | 0.5 | 0.5 | 0.2 |
| Monosaccharide/CAF | 0.12 | 0.19 | 0.19 | 0.24 | 0.17 | 0.23 | 0.32 | 0.31 | 0.39 | 0.33 |
| Evaluation Filtration rate | 1 | 1 | 1 | 2 | 3 | 1 | 1 | 1 | 1 | 1 |
| Extraction rate | 2 | 3 | 1 | 2 | 1 | 1 | 1 | 2 | 3 | 2 |
| Nutritious taste | Good | Somewhat clean taste but good | Very Good | Good | Somewhat bitter taste but good | Very Good | Very Good | Good | Somewhat clean taste but good | Good |
| Total Evaluation | ○ | Δ | ⊚ | ○ | Δ | ⊚ | ⊚ | ○ | Δ | ○ |

TABLE 6

| | Comparative Product | | | |
|---|---|---|---|---|
| Sample No. | 18 | 20 | 22 | 23 |
| Consolidation ratio | 0.96 | 0.97 | 0.75 | 0.80 |
| Theanine (%) | 2.0 | 1.5 | 0.5 | 0.2 |
| Monosaccharide/CAF | 0.08 | 0.10 | 0.40 | 0.43 |
| Evaluation Filtration rate | 2 | 2 | 4 | 4 |
| Extraction rate | 4 | 4 | 1 | 2 |
| Nutritious taste | Clean taste | Somewhat clean taste | Somewhat bitter taste | Somewhat bitter taste |
| Total Evaluation | X | X | X | X |

(Results/Discussion)

Figure 4:
FIG. 4 is a photograph of the appearance of sample NO. 4 obtained in Test 1.

FIGS. 4 and 5 are enlarged photographs of sample No. 4 (product of the present invention). It is found out that the sample of the present invention product is shaped into a massive form in which plural tea leaves gather and which has a space in the inside, by adjustment of moisture ratio of the tea leaves and conditions for rolling and pressure feed. In addition, it is recognized that such form of the tea leaves has a consolidation ratio in a range of 0.85 to 0.95. Consequently, it is recognized that the consolidation ratio is one marker that represents the form of the present tea leaves for extraction.

From the results of Tables 5 and 6, it was found out that the consolidation ratio of the present tea leaves for extraction is preferably in a range of 0.85 to 0.95. It was found out that when the consolidation ratio is in this range, the filtration rate and the extraction rate are fast, and the taste is not light as seen from the evaluation for the nutritious taste. Consequently, it was found out that delicious green tea can be extracted effectively for a short time.

3. The composition of claim 1, wherein the dry tea leaves are contained in a container.

4. The composition of claim 1, wherein the dry tea leaves are contained in a tea bag.

5. A composition comprising:
    a green tea beverage packed in a container, the green tea beverage comprising an extraction of a plurality of dry tea leaves compressed in a massive form with a space between the dry tea leaves,
    wherein the tea leaves are processed such that a relationship between a weight fraction X of a total content of theanine relative to a total mass of the dry tea leaves, and a weight fraction Y of a total content of monosaccharides relative to a total content of caffeine in the dry tea leaves, satisfies the following condition:

$$-0.136X+0.35 \leq Y \leq -0.136X+0.46.$$

6. A composition comprising:

an instant green tea powder comprising pulverized dry tea leaves, the pulverized dry tea leaves being obtained by pulverizing a plurality of dry tea leaves compressed in a massive form with a space between the dry tea leaves, wherein the tea leaves are processed such that a relationship between a weight fraction X of a total content of theanine relative to a total mass of the dry tea leaves, and a weight fraction Y of a total content of monosaccharides relative to a total content of caffeine in the dry tea leaves, satisfies the following condition:

$-0.136X+0.35 \leq Y \leq -0.136X+0.46.$

7. A composition comprising:

a powdered tea product comprising pulverized dry tea leaves, the pulverized dry tea leaves being obtained by pulverizing a plurality of dry tea leaves compressed in a massive form with a space between the dry tea leaves, wherein the tea leaves are processed such that a relationship between a weight fraction X of a total content of theanine relative to a total mass of the dry tea leaves, and a weight fraction Y of a total content of monosaccharides relative to a total content of caffeine in the dry tea leaves, satisfies the following condition:

$-0.136X+0.35 \leq Y \leq -0.136X+0.46.$

* * * * *